United States Patent
Milousheff et al.

(10) Patent No.: US 10,061,831 B2
(45) Date of Patent: *Aug. 28, 2018

(54) REFERENCE PARTITIONING FOR DATABASE OBJECTS

(71) Applicant: BMC Software, Inc., Houston, TX (US)

(72) Inventors: Zack Milousheff, San Jose, CA (US); Kalpa Ashhar, Pune (IN)

(73) Assignee: BMC Software, Inc., Houston, TX (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/056,108

(22) Filed: Feb. 29, 2016

(65) Prior Publication Data
US 2016/0179920 A1  Jun. 23, 2016

Related U.S. Application Data

(63) Continuation of application No. 14/143,517, filed on Dec. 30, 2013, now Pat. No. 9,311,381.

(51) Int. Cl.
*G06F 17/30* (2006.01)

(52) U.S. Cl.
CPC .... *G06F 17/30584* (2013.01); *G06F 17/3051* (2013.01); *G06F 17/30289* (2013.01); *G06F 17/30297* (2013.01); *G06F 17/30312* (2013.01); *G06F 17/30365* (2013.01); *G06F 17/30377* (2013.01)

(58) Field of Classification Search
CPC ......... G06F 17/30371; G06F 17/30584; G06F 17/30365
See application file for complete search history.

(56) References Cited

U.S. PATENT DOCUMENTS

2011/0161379 A1* 6/2011 Grund ............... G06F 17/30312 707/812
2014/0095547 A1* 4/2014 Guo .................. G06F 17/30073 707/792

(Continued)

OTHER PUBLICATIONS

Oracle Database VLDB and Partitioning Guide, 11g Release 1 (11.1), Jul. 2007, 216 pages.

*Primary Examiner* — Alexander Khong
(74) *Attorney, Agent, or Firm* — Brake Hughes Bellermann LLP

(57) ABSTRACT

In one general aspect, a computer-implemented system for reference partitioning database objects by a reference field includes at least one hardware processor, at least one database environment, the database environment supporting triggers and partitioning, at least one application program, and memory storing a reference field metadata framework. The reference field metadata framework identifies classes in a hierarchy of database objects, identifies at least one class as a root of the hierarchy, identifies, for each non-root class, a reference inheritance function for the class, and identifies, for each parent class-child class pair in the hierarchy, a relation-join query, the relation-join query being a join between tables in the database environment onto which the parent class and child class are persisted. The memory also stores triggers that use the framework to maintain values for the reference field for non-root database objects.

20 Claims, 11 Drawing Sheets

(56) References Cited

U.S. PATENT DOCUMENTS

2015/0074155 A1* 3/2015 Walter ............... G06F 12/0269
   707/816
2015/0186447 A1  7/2015 Milousheff et al.

* cited by examiner

1. Oracle connect by construct for hierarchical queries: ⟋ 900

```
select level, s.child, s.parent
from
(select 1 hr_level, ptab.table_name parent, dpt.table_name child
from user_constraints ptab, user_constraints dc, user_part_tables dpt
where dc.constraint_name = dpt.ref_ptn_constraint_name and
ptab.constraint_name = dc.r_constraint_name)s
start with s.parent = 'OBJ_ROOT'
connect by prior s.child = s.parent
order by level desc;
```

2. ANSI sql ("with clause") construct for hierarchical queries: ⟋ 950

```
with hs(hr_level, parent, child) as
(
select s.hr_level, s.parent, s.child
from
(select 1 hr_level, ptab.table_name parent, dpt.table_name child
from user_constraints ptab, user_constraints dc, user_part_tables dpt
where dc.constraint_name = dpt.ref_ptn_constraint_name and
ptab.constraint_name = dc.r_constraint_name)s
where s.parent = 'OBJ_ROOT'
union all
select pr.hr_level +1 hr_level, s.parent, s.child
from
(select 1 hr_level, ptab.table_name parent, dpt.table_name child
from user_constraints ptab, user_constraints dc, user_part_tables dpt
where dc.constraint_name = dpt.ref_ptn_constraint_name and
ptab.constraint_name = dc.r_constraint_name)s
join hs pr on pr.child = s.parent
)
select * from hs
order by hr_level desc;
```

FIG. 9

```
-- <virtual_center to data_ceter> relation join query (355->360)
select virtual_center_id parent_id, 'virtual_center' parent_data_type,
data_center_id child_id, 'data_center' child_data_type
from virtual_center vc
join data_center dc
using (virtual_center_id);
```
1005

```
-- <virtual_center to hosts> relation join query (355->365)
select virtual_center_id parent_id, 'virtual_center'
parent_data_type, host_id child_id, 'hosts' child_data_type
from virtual_center vc
join hosts h
using (virtual_center_id);
```
1010

```
-- <data_center to hosts> relation join query (360->365)
select data_center_id parent_id, 'data_center' parent_data_type,
host_id child_id, 'hosts' child_data_type
from data_center dc
join hosts h
using (data_center_id);
```
1015

```
/*
-- union query - combining the relation queries through a union
-- returning in its projection <parent_id, child_id> tuples of the all
the parents and children in the hierarchy
-- assuming single namespace for the object_ids (if not applicable
GUIDs need to be incorporated into the hierarchy objects)
*/
select virtual_center_id parent_id, 'virtual_center' parent_data_type,
data_center_id child_id, 'data_center' child_data_type
from virtual_center vc
join data_center dc
using (virtual_center_id)
union all
select virtual_center_id parent_id, 'virtual_center'
parent_data_type, host_id child_id, 'hosts' child_data_type
from virtual_center vc
join hosts h
using (virtual_center_id)
union all
select data_center_id parent_id, 'data_center' parent_data_type,
host_id child_id, 'hosts' child_data_type
from data_center dc
join hosts h
using (data_center_id);
```
1020

FIG. 10

```
-- hierarchy traversal query - for virtual center
with
hr (hier_root_id, hier_root_data_type, parent_id, parent_data_type, child_id,
child_data_type, child_hierlevel)
as
(
 select parent_id hier_root_id, parent_data_type hier_root_data_type, parent_id,
parent_data_type, child_id, child_data_type, 1
    from
  -- start with
   (select virtual_center_id parent_id, 'virtual_center' parent_data_type,
data_center_id child_id, 'data_center' child_data_type
      from virtual_center vc
    join data_center dc
    using (virtual_center_id)
    union all
    select virtual_center_id parent_id,  'virtual_center' parent_data_type, host_id
child_id, 'hosts' child_data_type
    from virtual_center vc
    join hosts h
    using (virtual_center_id)
  )
  -- recurse
  union all
  select parent_query.hier_root_id, parent_query.hier_root_data_type,
   child_query.parent_id, child_query.parent_data_type, child_query.child_id,
child_query.child_data_type,
   parent_query.child_hierlevel + 1
  from
   (select virtual_center_id parent_id, 'virtual_center' parent_data_type,
data_center_id child_id, 'data_center' child_data_type
      from virtual_center vc
    join data_center dc
    using (virtual_center_id)
    union all
    select virtual_center_id parent_id,  'virtual_center' parent_data_type, host_id
child_id, 'hosts' child_data_type
    from virtual_center vc
    join hosts h
    using (virtual_center_id)
    union all
    select data_center_id parent_id, 'data_center' parent_data_type, host_id
child_id, 'hosts' child_data_type
    from data_center dc
    join hosts h
    using (data_center_id)
   ) child_query
   join hr parent_query
   on (parent_query.child_id  = child_query.parent_id)
)
search breadth first by parent_id set seq
cycle parent_id set is_cycle to '1' default '0'
select hier_root_id, hier_root_data_type,
 parent_id, parent_data_type, child_id, child_data_type,
 child_hierlevel, seq, is_cycle
from hr
where is_cycle = 0
order by seq;
```

REFERENCE PARTITIONING FOR DATABASE OBJECTS

RELATED APPLICATION

This application is a continuation of, and claims priority to, U.S. application Ser. No. 14/143,517, filed Dec. 30, 2013, entitled "LIFECYCLE REFERENCE PARTITIONING FOR DATABASE OBJECTS," the disclosure of which is incorporated herein in its entirety.

BACKGROUND

A database is an organized collection of data. Some databases organize the data into hierarchies. For example, one database object may represent a data center. The datacenter may have one or more devices, and each device may have one or more components. In the example above, the datacenter object is the root of the hierarchy, with devices as children, and each device may have one or more component children.

Object instances in a database commonly have 3 lifecycle states. In the active stage the object has the ability to be updated and form new relationships. In the inactive stage the object is not being updated and not used to form new relationships, but the object is kept for historical persistence. For example, when a new version of the object is created, the old version may be needed for maintaining short term historical persistence and/or for operational reporting. In the deleted stage, the object is no longer needed from an application functional perspective and can be deleted physically or archived. The lifecycle state of an object affects the performance and scalability of the database and the maintainability of the data set.

Problems associated with maintaining lifecycle states for database objects include hindering access to active data, slow or off-line purges of deleted objects, and complex hierarchies. For example, while the inactive objects are necessary for persistence and operational reporting, their existence can slow down the data access to active data due to inflated cardinality. Furthermore, deleted data (e.g., table rows with a deleted lifecycle state) needs to be purged or archived periodically from the database for performance reasons. But row deletion is a very slow operation and may render a row-based purge or archive impractical. Furthermore, row-level deletes cause significant blocking in highly transactional systems, slowing down overall database access times, and leading to fragmentation that requires regular off-line database activity (defragmentation) to maintain adequate database performance. Application program requirements often make off-line cleanup undesirable or impermissible, limiting database objects lifecycle maintenance, including purging deleted objects, to on-line procedures.

Reference partitioning in a database is a method of partitioning of a group of tables together based on reference to a field or fields in another related table. In reference partitioning, every child's partitioning is a function of the partitioning of its parent. In lifecycle management, the partitions may represent the lifecycle state of an object, for example an active partition with database objects in the active stage, an inactive partition with database objects in the inactive stage, and a deleted partition with database objects in the deleted stage, with the child following the lifecycle partition of its parent. Putting inactive and deleted objects in a separate partition speeds access to active data, but many databases do not support reference partitioning, so this method of lifecycle management is unavailable to applications using such databases. Additionally, databases that currently support reference partitioning do not support it for ragged hierarchies, e.g. children having more than one parent, or hierarchies with cycles. Such hierarchies are complex hierarchies, as opposed to simple hierarchies that do not include multiple parents or cycles. Because many real-world applications involve complex hierarchies, and because many databases do not support reference partitioning at all, reference partitioning for lifecycle maintenance currently has limited usefulness.

SUMMARY

Systems and methods provide a database-agnostic framework for on-line lifecycle management of database objects utilizing the table partitioning tools currently provided by the database environment. The framework uses a metadata definition of the object hierarchy that facilitates use of database triggers for maintaining a reference partitioning across the object hierarchy, even when the database itself does not support reference partitioning. Furthermore, the framework makes reference partitioning possible for complex hierarchies (e.g., ragged hierarchies and cyclic hierarchies). The framework synchronizes partitioning amongst related objects and manages the lifecycle of underlying objects, hiding such operations from the application programs that use and maintain the objects. Finally, the framework provides an on-line maintenance process that cascades the object hierarchy and purges (or archives) deleted objects in a high performance manner—avoiding row-level deletes and data fragmentation. Because the framework is database-agnostic, it can be used with applications that access multiple different databases.

In one general aspect, a computer-implemented method in a database partitioned based on a lifecycle state for database objects, each database object being a row in a table and the database objects being organized in a hierarchy, includes receiving, from an application program, a new lifecycle state for a root database object in the hierarchy and updating the lifecycle state for the root object, thereby causing a table row associated with the root object to change partitions in the database. The method also includes locating a first database object that is a child of the root object in the hierarchy and applying an inheritance function associated with a class of the child object to determine a lifecycle state for the first database object. When the determined lifecycle state differs from a current lifecycle state for the first database object, the method also includes changing the current lifecycle state to the determined lifecycle state and moving a table row for the first database object to a partition associated with the determined lifecycle state. The method may include repeating the locating, applying, and changing for all children of the root object.

Implementations can include one or more of the following features. For example, the first database object may have at least two parent objects in the hierarchy and applying the inheritance function can include determining the parent objects using a parent retrieval query associated with the class of the first database object; and determining a lifecycle state for the determined parent objects. As another example, the inheritance function may be stored as an attribute of the class in a metadata table and/or the hierarchy may include database objects stored in at least two databases from different vendors. In some implementations, the database may not support reference partitioning. In another example, the new lifecycle state for the root object may be a delete stage and the method may also include traversing the hierarchy from the root object, depth first, avoiding cycles and, at each leaf object of the hierarchy, determining that a lifecycle state for the leaf object is a deleted stage and issuing a partitioning maintenance command for the database for the leaf object. In some such implementations, traversing the hierarchy may be performed in accordance with a relation-join query associated with a class of the root object.

In some implementations, when the application program updates a foreign key of a second database object, the method may also include applying an inheritance function associated with a class of the second database object to determine a lifecycle status of the second database object, setting a current lifecycle status of the second database object to the determined lifecycle status, locating a third database object that is a child of the second database object in the hierarchy, and applying an inheritance function associated with a class of the third database object to determine a lifecycle state for the third database object. When the determined lifecycle state differs from a current lifecycle state for the third database object, the method includes changing the current lifecycle state to the determined lifecycle state and moving a table row for the third database object to a partition associated with the determined lifecycle state. The method may also include repeating the locating, applying, and changing for all children of the second database object.

In some implementations, when the application program inserts a second database object into the hierarchy, the second database object being a non-root object for the hierarchy, the method can include applying an inheritance function associated with a class of the second database object to determine a lifecycle state for the second database object, A table row for the second database object being stored in a partition associated with the determined lifecycle state for the second database object.

In another general aspect, a system for reference partitioning database objects by lifecycle state can include at least one hardware processor, at least one database environment, the database environment supporting triggers and partitioning, at least one application program, and memory. The memory can store a lifecycle metadata framework that identifies classes in a ragged hierarchy of database objects, identifies at least one class as a root of the hierarchy, identifies, for each non-root class, a lifecycle inheritance function for the class, and identifies, for each parent class-child class pair in the hierarchy, a relation-join query, the relation-join query being a join between tables in the database environment onto which the parent class and child class are persisted. The memory may also store triggers that use the framework to maintain lifecycle states for non-root database objects, including at least a first trigger invoked after a lifecycle state of a database object in a root class is changed, a second trigger invoked when a non-root database object is inserted, and a third trigger invoked when a non-root database object has a change in parent the system cause a processor to perform a process.

Implementations can include one or more of the following features. For example, the first trigger may use the lifecycle metadata framework to traverse the hierarchy from the database object in the root class downwards, avoiding cycles, and set a lifecycle state of each child database object reached in the traversal according to the lifecycle inheritance function for a class of the child database object, wherein the child database object is assigned to a partition according to its lifecycle state. As another example, the second trigger may use the lifecycle metadata framework to determine a lifecycle state for each parent database object of the inserted non-root database object, apply the lifecycle inheritance function for the class of the inserted non-root database object to determine a lifecycle state for the non-root database object, and assign the non-root database object to a partition according to the determined lifecycle state.

In some implementations, the third trigger may use the lifecycle metadata framework to determine a lifecycle state for each parent database object of the non-root database object, apply the inheritance function for the class of the non-root database object to determine a lifecycle state of the non-root database object, wherein the database object is assigned to a partition according to the lifecycle state, assign the non-root database object to a partition according to the determined lifecycle state, traverse the hierarchy from the non-root database object downwards, avoiding cycles, and set a lifecycle state of each object reached in the traversal according to the inheritance function for a class of the object reached in the traversal.

In some implementations, the memory may also store instructions that, when executed by the at least one processor, cause the system to perform operations that include receiving a root class of the hierarchy to purge, selecting a database object of the root class, and traversing, using the framework, the hierarchy downward from the database object, depth first, avoiding cycles. The operations may also include, at a leaf database object in the hierarchy, determining whether a lifecycle state for the leaf database object is a deleted stage, and when the lifecycle state is a deleted stage, issuing a truncate partition command for the leaf database object, the truncate partition command being a command supplied by the database environment.

In some implementations, the framework may also include a hierarchy traversal query for at least some of the classes and a parent retrieval query for at least some of the classes. The hierarchy traversal query for a first class may be generated prior to the triggers being invoked and is associated with the first class and stored in the framework. In some implementations, the generation of the hierarchy traversal query for the first class can include using a hierarchical query, avoiding cycles, to find the parent class-child class pairs where the first class is the parent, construct a union query of the relation-join queries for each parent class-child class pair found, the union query returning a result set of identifiers for the parent class and the child class, and using an outer hierarchical query, avoiding cycles, to reach database objects in the tables identified in the union query using the result set of the union query. In some implementations, the parent retrieval query for a first class is generated prior to the triggers being invoked and is associated with first class and stored in the framework. Generation of the parent retrieval query for the first class may include using a hierarchical query, avoiding cycles, find the parent class-child class pairs where the first class is the child, constructing a union query of the relation-join queries for each parent class-child class pair found, the union query returning a result set of identifiers for the parent class and the child class, and using an outer hierarchical query, avoiding cycles, to reach database objects in the tables identified in the union query using the result set of the union query.

In another general aspect, a method of database object lifecycle maintenance for database objects in a ragged hierarchy includes receiving a class, the class being a root in the ragged hierarchy, the hierarchy being defined through a lifecycle framework that defines classes in the hierarchy, parent-child relationships between classes, and, for each parent-child relationship, stores a join query. The method also includes selecting a database object instance of the class, traversing the hierarchy downward from the database object, depth first, avoiding cycles, the traversal being accomplished via a hierarchical query generated at least by a union of the join queries for parent-child relationships related to the class. The method also includes, at a leaf database object reached by traversing the hierarchy, determining whether the leaf database object is in a partition for deleted objects, and when the leaf database object is in the partition for deleted objects, issuing a partition maintenance command for the leaf database object, the partition maintenance command being a database-provided command. The maintenance command may be a truncate partition command or a command that archives the partition. In some implementations, the hierarchical query generated is associated with the class and stored as part of the framework.

Another aspect of the disclosure can be embodied on a computer-readable medium having recorded and embodied thereon instructions that, when executed by a processor of a computer system, cause the computer system to perform any of the methods disclosed herein.

The details of one or more implementations are set forth in the accompanying drawings and the description below. Other features will be apparent from the description and drawings, and from the claims.

BRIEF DESCRIPTION OF THE DRAWINGS

FIG. 9 is an example of queries that can be used in an efficient on-line maintenance process in a database that supports reference partitioning, according to an implementation.

FIG. 10 is an example of relation-join queries and a generated union query, according to an implementation.

FIG. 11 is an example hierarchy traversal query, according to an implementation.

DETAILED DESCRIPTION

The systems and methods described herein can be used to efficiently maintain a lifecycle state for database objects with complex hierarchies. The systems and methods described can be used with any database that supports triggers and partitioning, regardless of whether the database itself supports reference partitioning. For example, a system can include a lifecycle metadata framework that facilitates definition and traversal of a hierarchy of database objects and uses inheritance functions to determine the lifecycle status of a child, regardless of the number of parents the child has or whether the hierarchy includes cycles. The framework hides the synchronization of the lifecycle state between children and parents from the application programs and handles the partition assignment of objects for the database. Thus, the framework is database agnostic and can even be used when the hierarchy is implemented in more than one database (e.g., different environments from different vendors). The lifecycle state of a database object may be stored in a field in the table supporting the object. The application program may update this field for root objects and the framework may update it for all other objects. Furthermore, the systems and methods provide on-line maintenance operations that purge or archive deleted objects efficiently without taking the database offline. While the system described below uses the framework for reference partitioning of a lifecycle state, it is understood that the framework can be used to implement reference partitioning based on any field in databases that do not currently support reference partitioning or reference partitioning on complex hierarchies. Accordingly, implementations are not limited to reference partitioning based on a lifecycle state.

Figure 1:
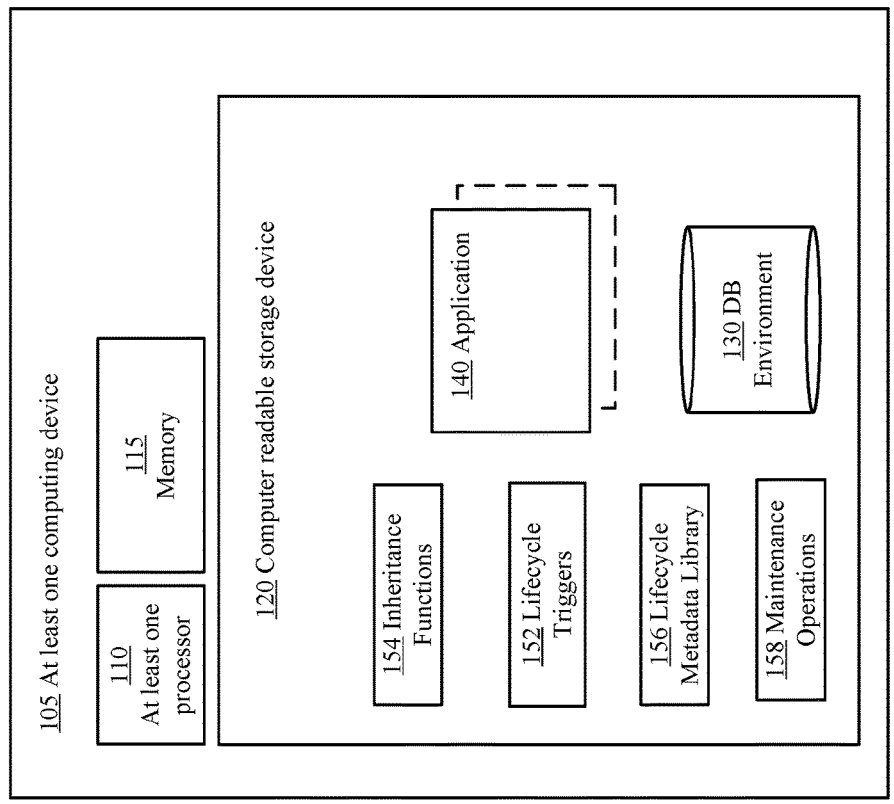
FIG. 1 is a block diagram that illustrates a database object lifecycle reference partitioning system, according to an implementation.

FIG. 1 is a schematic diagram that illustrates an example database object lifecycle reference partitioning system 100 (also referred to herein as "lifecycle reference partitioning system" or "lifecycle system"). The lifecycle reference partitioning system 100 can be embodied, for example, on one or more source computing devices. The lifecycle reference partitioning system 100 can be, for example, a server that includes one or more computing devices 105, multiple servers that include one or more computing devices 105, etc. Multiple computing devices 105 may be in communication with each other via a communications network (not shown). For example, the network can be wired or wireless and can include, a local area network (LAN), a wide area network (WAN), etc. implemented using, for example, gateway devices, bridges, switches, and/or so forth. The network can include one or more segments and/or can have portions based on various protocols such as XCF, TCP/IP, SNA, Internet Protocol (IP) and/or other communication protocols including a proprietary protocol. The network can include at least a portion of the Internet. In some implementations, the network can include multiple computing devices and/or multiple server devices.

The computing device 105 can include one or more hardware processors 110 configured to execute one or more machine executable instructions or pieces of software, firmware, or a combination thereof. The computing device 105 can include, an operating system (not shown) and one or more computer memories 115, such as a main memory, configured to store one or more pieces of data, either temporarily, permanently, semi-permanently, or a combination thereof. The memory 115 may include volatile memory, non-volatile memory, or a combination thereof. The computing device 105 can also include one or more storage mediums 120, such as a non-transitory computer-readable storage disk or flash memory, configured to store data in a semi-permanent or substantially permanent form.

In some implementations, the computing device 105 may include one or more other hardware components not shown in FIG. 1, such as for example, a display or monitor, a keyboard, a touchscreen, a camera, a mouse, a touchpad, a trackpad, a video processor, etc. Computing device 105 may also be in communication with one or more client computing devices, e.g., devices used by users to remotely execute application programs 140, to build and maintain application programs 140, etc.

The lifecycle reference partitioning system 100 also includes one or more databases 130 stored in one or more of storage mediums 120 (e.g., disk, tape, main memory) of the computing device 105. The database 130 may also be two database environments from two different database vendors. The database 130 can be any database that supports triggers and partitioning. In a database a table generally represents an object, with each row in the table being a separate object. Tables may also be considered classes, Thus, for example, a datacenter object may be an instance of a datacenter class and be stored in a row of a datacenter table. Partitioning is the logical division of data of the same type, e.g., the logical division of a table. For example, partitioning may be based on the value in a field or combination of fields (columns), such as a lifecycle state column. Triggers are user-defined (e.g., system administrator, database administrator, application programmer, etc. defined) procedures that the database system executes when certain database commands, e.g., insert, update, or delete statements, are issued against the associated database object. Triggers are not application specific, and are thus transparent to the executing application program.

Figure 2:
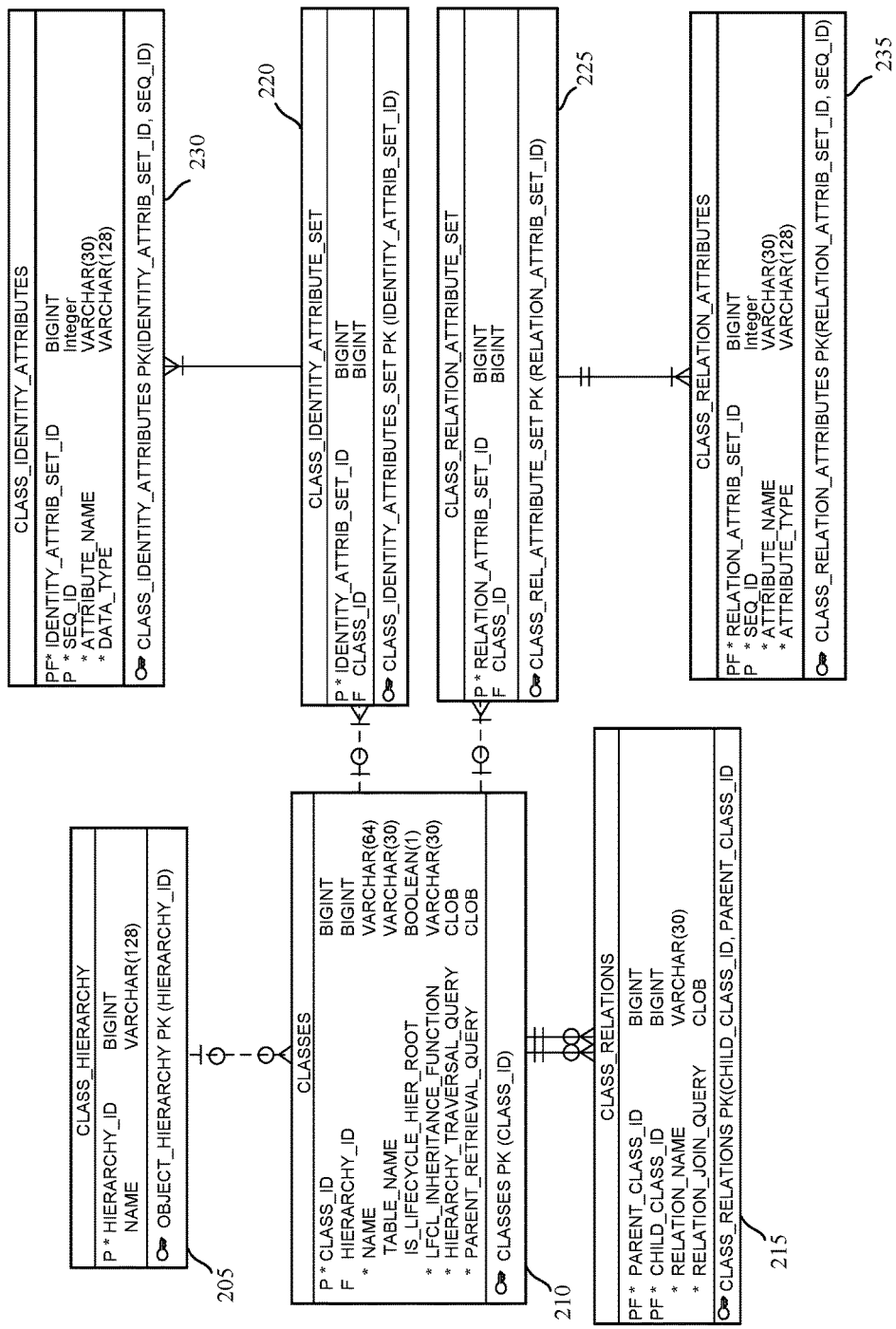
FIG. 2 is an example of a metadata definition for a lifecycle framework that supports reference partitioning, according to an implementation.

Storage medium 120 may include a lifecycle metadata library 156. The lifecycle metadata library 156 includes a metadata definition layer that supports reference partitioning in any database that supports partitioning. FIG. 2 illustrates one example of data elements used in a metadata definition layer of the metadata library 156. The metadata library 156 may allow an application programmer, database administrator, or other user to define a class hierarchy for database objects, for example using the class hierarchy definition 205. Each hierarchy may include one or more classes 210 as members of the hierarchy. One or more of the classes may be designated as a root node for the lifecycle of the hierarchy, for example using the "is_lifecycle_hier_root" field in the class 210 definition. A hierarchy may have more than one root. The lifecycle state of database objects that are a root class of the hierarchy may be set explicitly by an application program, while database objects that are non-root nodes (non-root classes) in the hierarchy may be set by the triggers that are part of the lifecycle reference partitioning framework. Thus, the application may control the lifecycle state of the root nodes and the system may use the framework, including information supplied as part of the metadata library 156, to ensure that the lifecycle state of the children in the hierarchy are properly set according to the stage of the root node.

The class relations metadata table 215 may hold the class relationship between the classes in the hierarchy. It persists the parent class_id, the child class_id and the relation-join query that identifies the join between the tables onto which the classes are persisted. The relation-join query is generated based on the primary and foreign keys defining the referential correspondence between parents and children. The relation-join query is provided by the application programmer or systems administrator or other user because it is data-driven (e.g., specific to tables used to implement the hierarchy). The relation-join query provides a join between the parent and child and is based on the class identity attribute set 220 and/or the class relation attribute set 225.

The relation-join query provides an opportunity to generate a hierarchical query that traverses the hierarchy for a specific instance of the class.

The class identity attribute set 220 identifies the primary key attributes of the corresponding tables that are instances of the class, e.g. the tables onto which the underlying classes are persisted. Thus, the class identity attribute set 220 enables the system, from an instance of a parent class, to identify the instances of its children, as will be explained below. In other words, a parent may use class identity attribute set 220 to identify the table columns used to identify instances of its children. Because the primary key may include any number of fields, the primary key may be defined as a set, and the class identity attributes 230 may identify the individual fields that make up the primary key.

The class relation attribute set 225 holds and the foreign key attributes of the corresponding tables that are parents of the class. Thus, the class relation attribute set 225 for an instance of a particular class enables the system to identify the instances of its parents. In other words, a child may use class relation attribute set 225 to identify the fields used to identify instances of its parents. Because the foreign key may also include a number of different fields, the foreign key may be defined as a set and the class relation attributes 235 may identify each of the fields in the set. In practice, all of the attributes that make up the primary key or foreign key can be identified by a globally unique identifier (GUID) persisted with every instance of an object that acts as an alias for the instance. In some implementations, the system may use this GUID rather than the set of fields that make up the primary key or foreign key.

Some of the data that is included in the metadata framework 200, such as the class identity attribute set 220 and the class relation attribute set 225 may be found in the database catalog or similar structure of the various database environments. The lifecycle framework extracts this information to make the system database agnostic. In other words, the metadata framework 200 enables the system to use lifecycle partitioning regardless of the type of underlying database, to use the lifecycle reference partitioning with complex hierarchies, or even on hierarchies that operate over two different database environments (e.g., databases from different vendors).

Based on the class relation metadata table 215, the database triggers of the partition maintenance operations 158 implement the traversal of the hierarchy and synchronization of lifecycle status of database objects. It is understood that when a change of the class hierarchy structure occurs the metadata represented in FIG. 2 correspondingly needs to be regenerated.

The metadata framework 200 may also include other attributes useful in optimizing traversal of the hierarchy. For example, the classes 210 may include a hierarchy-traversal-query field for storing a pre-generated query for finding the children of an instance of the class. This query may be generated as described herein with regard to FIG. 5 and stored in as an attribute of the class. This enables the system to avoid generating the query each time a database trigger is invoked, and is thus one performance optimization. Similarly, the classes 210 table may also include a parent-retrieval-query field for storing a pre-generated query for finding the parents of an instance of the class.

Returning to FIG. 1, storage medium 120 may also include one or more application programs 140. Application programs 140 may access data in the database 130, may manipulate the data, report on the data, generate user-interfaces that allow a user to insert, modify, and delete the data etc. In manipulating the underlying data, the application programs 140 may change the lifecycle state of the underlying root data objects. For example, the lifecycle reference partitioning framework may include an interface for the application program that allows the application program to change the lifecycle state of a root node. For example, the framework may provide a change_lifecycle_stage( ) function for the application programs 140 to use. The function may take a root node and a lifecycle state as parameters. As explained above, the root node(s) of a hierarchy may be defined using the lifecycle metadata library 156, for example by a field in the class 210 definition. In some implementations, the provided function may prevent the application program 140 from changing the lifecycle state of any node that is not defined as a root node in the hierarchy.

Figure 5:
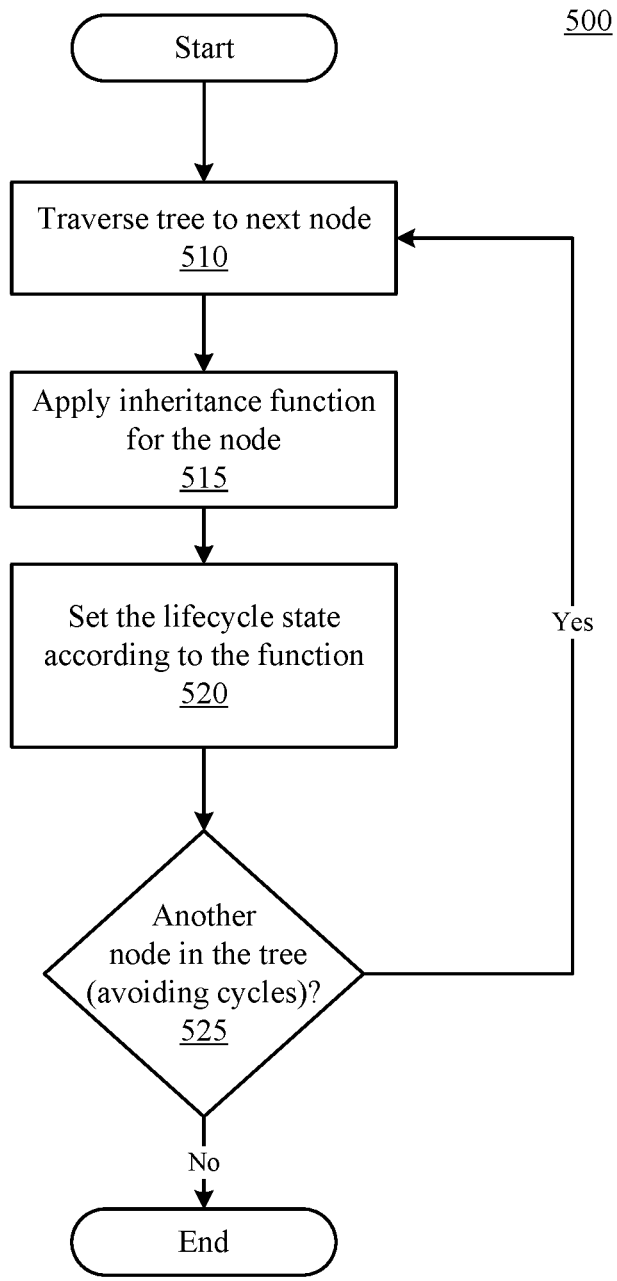
FIG. 5 is a flowchart illustrating an example trigger for maintenance of reference partitioning after an update of a root object, according to an implementation.
Figure 6:
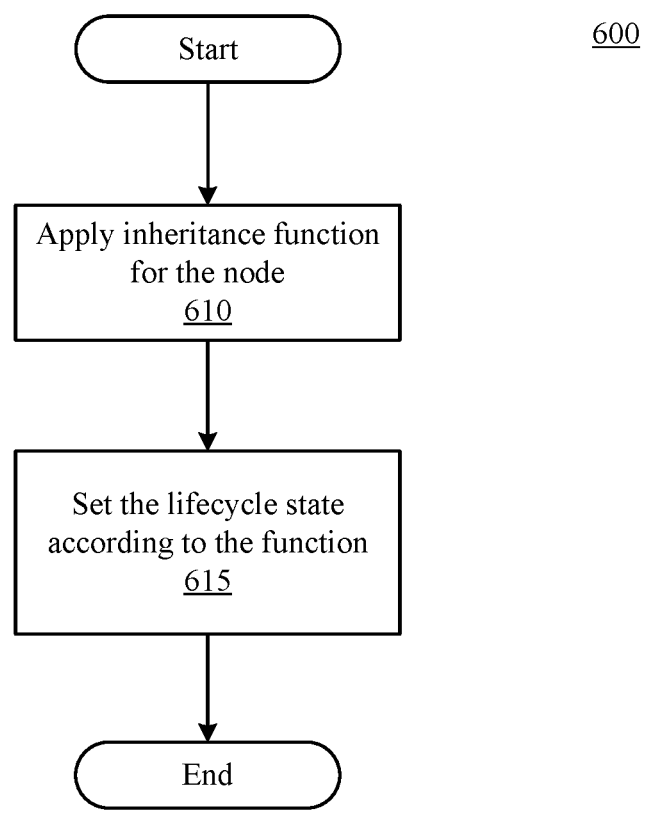
FIG. 6 is a flowchart illustrating an example trigger for maintenance of reference partitioning after a child object is inserted into the hierarchy, according to an implementation.
Figure 7:
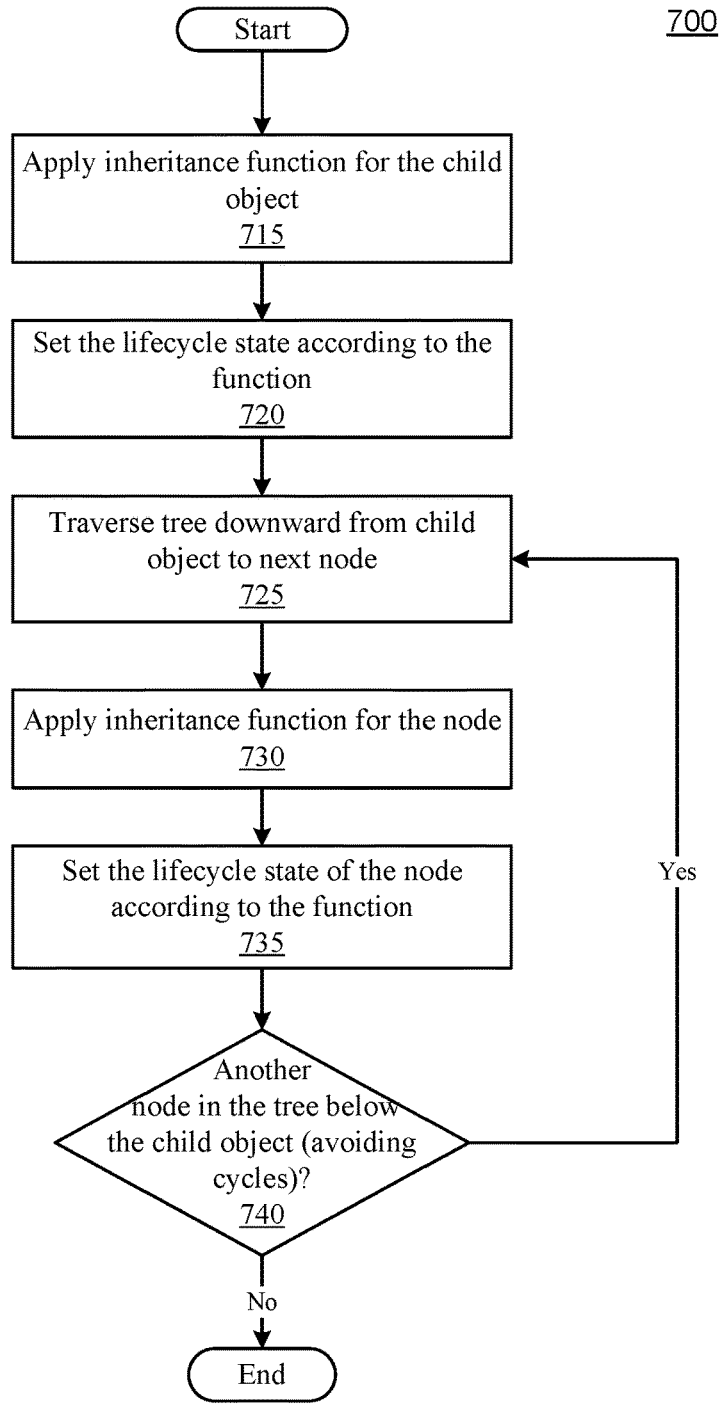
FIG. 7 is a flowchart illustrating an example trigger for maintenance of reference partitioning after a foreign key update of a child object, according to an implementation.

Storage medium 120 may also include lifecycle triggers 152. Lifecycle triggers 152 may include procedures invoked when a root database object is updated, when a child database object is added, or when a child database object has a change in parent (e.g., the foreign key is updated). FIGS. 5-7 are examples of lifecycle triggers 152, according to some implementations. Storage medium 120 may also include inheritance functions 154. Inheritance functions 154 may be logic used by the system to determine the lifecycle state of a child node. The inheritance functions 154 may include logic for locating the parent node or nodes, for determining the lifecycle state of the parent(s), and for determining the lifecycle state of the child node based on the stage(s) of the parent(s). The inheritance functions 154 may include an inheritance function for each non-root class and may be provided by an application program, system administrator, or other user. In some implementations, the inheritance function for a class may be identified in the class metadata, for example as an attribute or field in the classes 210 metadata of FIG. 2.

In system 100, the lifecycle triggers 152 set the lifecycle state of a child node according to the parent relationship in coordination with a lifecycle inheritance function 154 associated with the child's class. The inheritance function 154 for a class can take a number of forms. For example, an inheritance function may indicate that the child is active if all of the parents are active. In some implementations the lifecycle state may be represented by a numeric value, such as zero for active, one for inactive, and two for deleted. The lifecycle state may be a field (e.g., column) in a table onto which the database object is persisted. In an implementation using the lifecycle state enumeration set forth above, the corresponding function for lifecycle inheritance may set the lifecycle state of the child to the minimum lifecycle state of all parents. Another example inheritance function may indicate the child is not active if all of the parents are not active. Such a function may set the lifecycle state of the child to the maximum stage of the parents, for example when the enumeration example for lifecycle state described above is used. Other inheritance functions 154 may include selecting a controlling parent or a relatively complex function mapping the lifecycle states of all parents to a single lifecycle state to be inherited by the child. The inheritance functions can be persisted in the lifecycle metadata for the class, for example in a field in the class 210 object.

Figure 8:
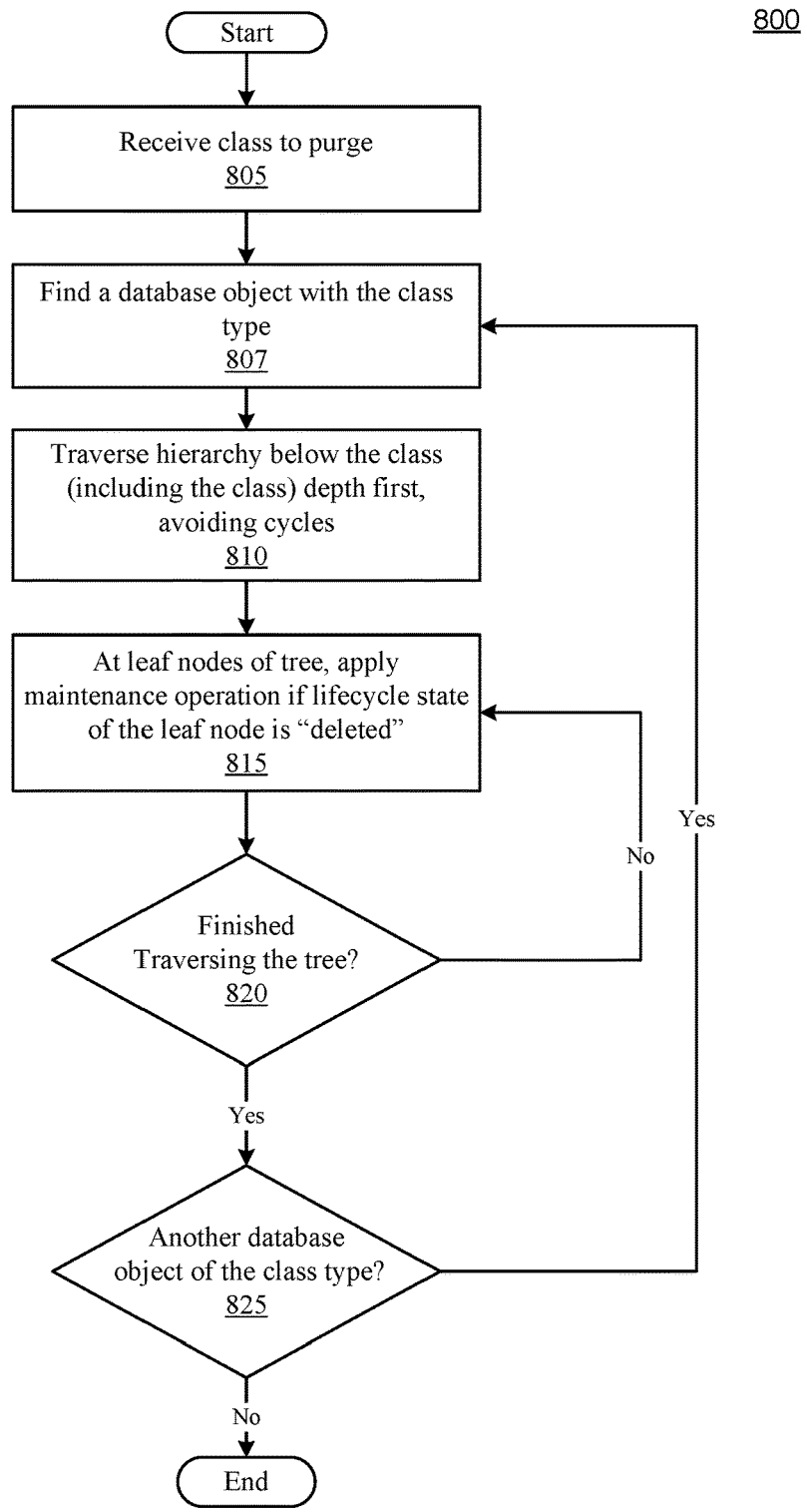
FIG. 8 is a flowchart illustrating a process for performing an efficient on-line maintenance process using the lifecycle framework, according to an implementation.

The storage device 120 may also include maintenance operations 158. Maintenance operations 158 may include procedures or computer instructions for purging or archiving database objects in the deleted partition without using row-level deletes, thus improving database performance without incurring database outage time. For example, maintenance operations 158 may cascade through the object hierarchy, using the lifecycle metadata, and correspondingly purge or archive the objects in the deleted partition in a high performance manner, e.g., using the underlying partitioning maintenance commands provided by the database vendors. Examples of such maintenance commands include truncate, exchange, switch, detach, etc. However, because such commands are issued at the database object level, traversing the hierarchy allows the lifecycle partitioning system to efficiently identify the nodes in the hierarchy ready for deletion and to issue the proper partition command, avoiding row level deletion and preventing data fragmentation. FIG. 8 illustrates an example maintenance operation 158 in accordance with some implementations.

Figure 3:
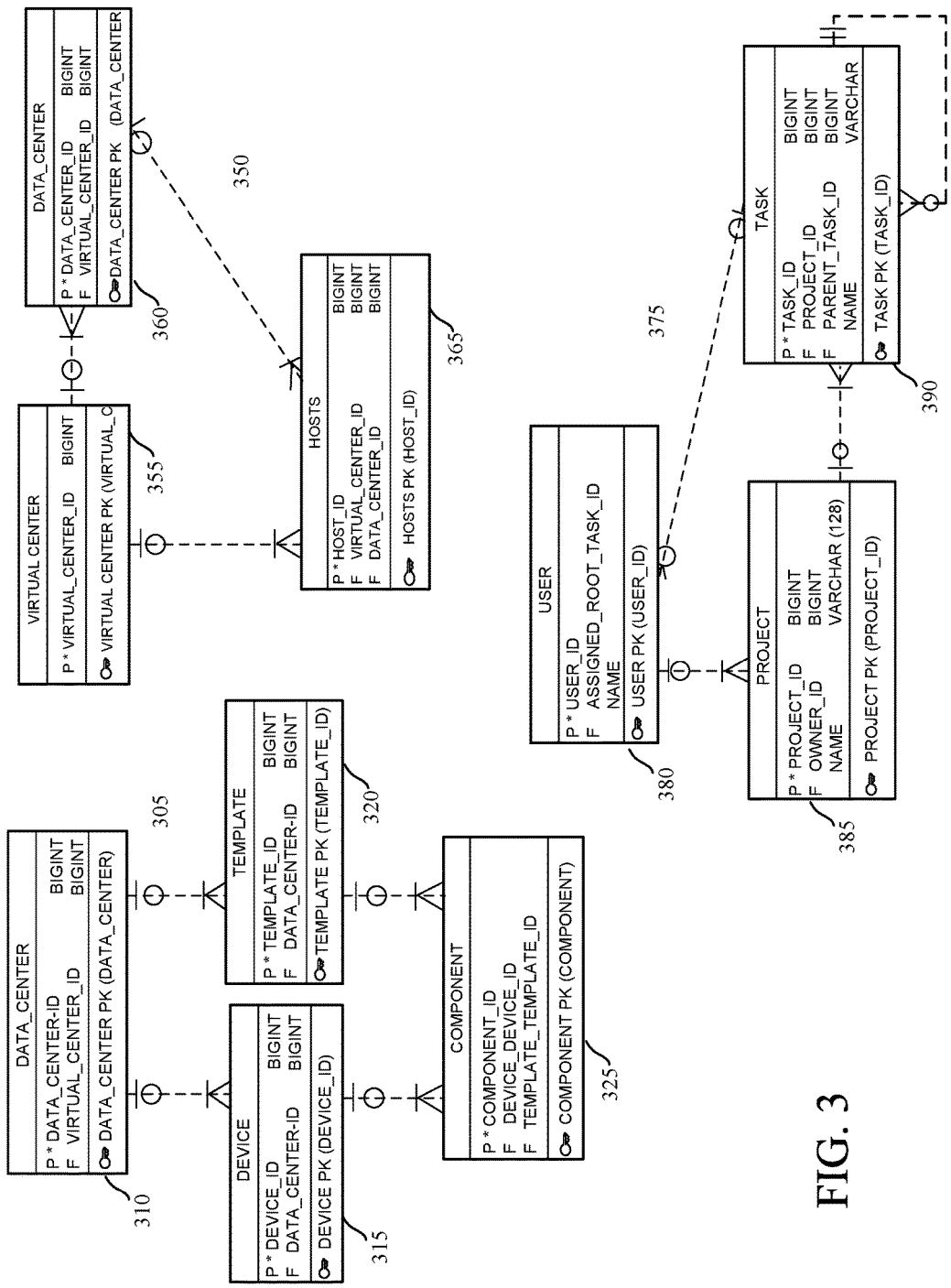
FIG. 3 illustrates example object diagrams for various complex object hierarchies.

FIG. 3 illustrates object diagrams for three examples of complex class hierarchies. Of course, the examples are for illustration only and implementations are not limited to the example hierarchies shown. In the first example, the data center hierarchy 305 has a data center class 310, a device class 315, a template class 320, and a component class 325. In the example of the data center hierarchy 305, the datacenter class 310 is designated as the lifecycle root. An instance of the datacenter class 310 can have zero to many device class 315 instances as children and zero to many template class 320 instances as children. Each device class 315 instance may have zero to many component class 325 instances as children. Each template 320 may also have zero to many component class 325 instances as children. Data center hierarchy 305 represents a ragged hierarchy because an instance of the component class 325 may have two parents—one an instance of the device class 315 and the other an instance of the template class 320. In another example, an instance of the component class 325 may have two different instances of the device class 315 as parents. An example of database object instances of the data center hierarchy 305 is illustrated as hierarchy 405 of FIG. 4.

The virtual center hierarchy 350 illustrates another example of a ragged hierarchy. The virtual center hierarchy 350 includes a virtual center class 355, a data center class 360, and a host class 365. The virtual center class 355 is defined as the root of the hierarchy and may have zero to many host class 365 instances as children and zero to many data center class 360 instances as children. The data center class 360 may also have zero to many host class 365 instances as children. Thus, an instance of the host class 365 can have at least two parents. Such an arrangement is illustrated as hierarchy 450 of FIG. 4.

Figure 4:
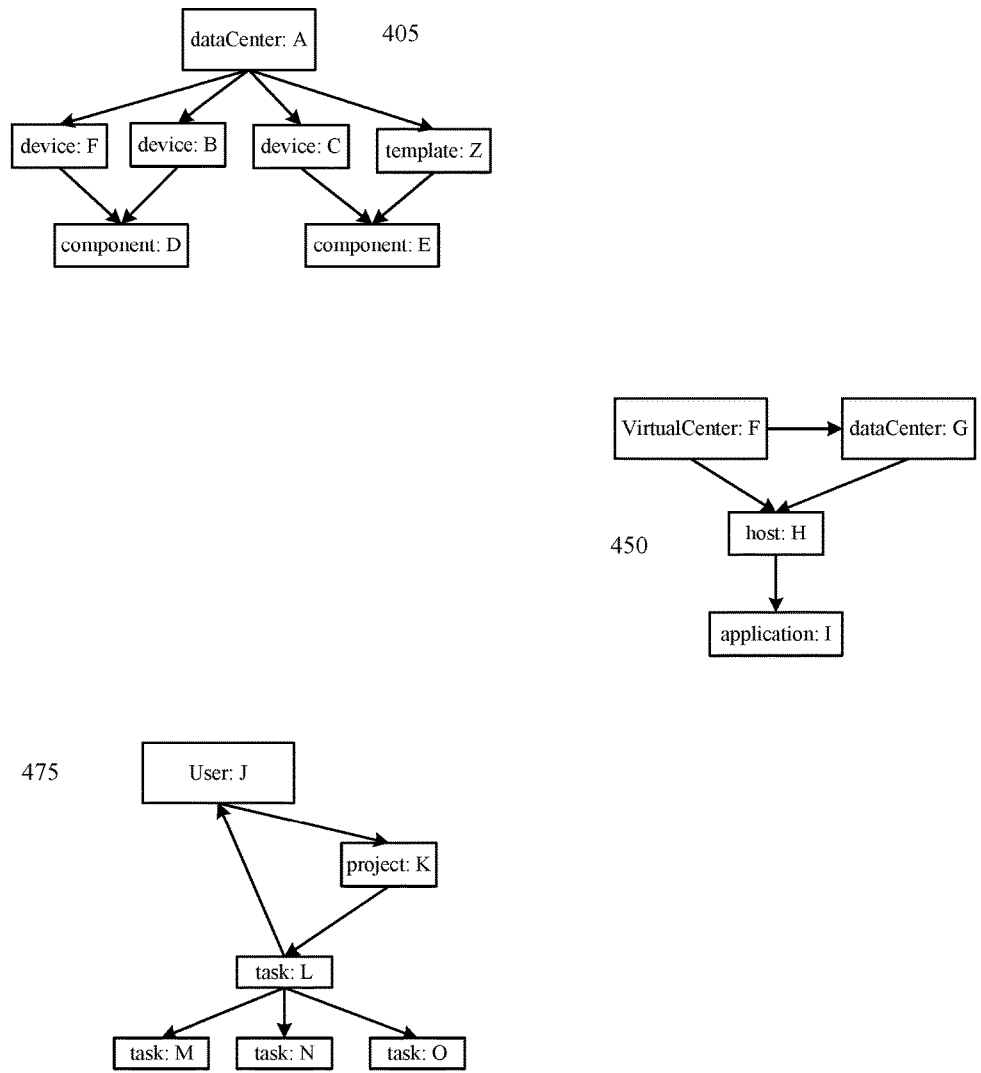
FIG. 4 is a block diagram that illustrates instances of database objects in complex hierarchies, according to an implementation.

The project task assignment hierarchy 375 illustrates an example of a cyclic hierarchy. In the project task assignment hierarchy 375 an instance of a user class 380 owns an instance of a project class 385. The project class 385 instance may have one or more task class 390 instances as children. The instances of the task class 390 may be defined in a hierarchical structure, with a root task that is made of up child tasks, which each may be made up of further tasks, etc. An instance of a user class 380 may be assigned to an instance of a root task 390, e.g., a root task may be assigned to the owner of the project. Thus, an instance of the task class 390 may be the parent of an instance of the user class 380, which is the root of the project task assignment hierarchy 375. Hierarchy 475 of FIG. 4 illustrates an example of such an arrangement. It is understood that the hierarchies illustrated in FIG. 3 are simplified for the sake of explanation and brevity, and that implementations may include even more complex hierarchies.

FIG. 5 is a flowchart of a database trigger 500 invoked when an application program changes the lifecycle status of a root object in a hierarchy. Trigger 500 may be the only trigger needed for maintenance of the reference partitioning of a root object because deletes are handled via updates of the lifecycle state (e.g., changing the stage to deleted) and an inserted (new) root object has no children, so coordination of the lifecycle state of children is unnecessary because children do not yet exist. In some implementations, the constraint that children do not yet exist for new root objects is protected by the referential integrity (RI) of the database environment. In other words, the database environment does not allow child object to be created without a parent object and does not allow a parent to be deleted when the child object still exists. Trigger 500 may be initiated after an update of the lifecycle state of a root object. Accordingly, the lifecycle state of the root object is set according to the value specified by the application program prior to trigger 500 starting. When trigger 500 begins, the system traverses the hierarchy tree avoiding cycles to the next level (510). Traversal may be accomplished through a hierarchical query, for example one generated on the fly or pre-generated and stored as part of the class definition, e.g., in class 210 of FIG. 2. Avoiding cycles is an option specified as part of a hierarchical query. At each node in the next level, the system may apply the inheritance function for the node (515). Applying the inheritance function includes traversing the tree upwards to find the parents of the node, for example using the relation-join query specified in the class relations metadata table 215. When the lifecycle state of the parent or parents is obtained, the system may use the inheritance function for the class of the node to set the lifecycle state of the current node (520). Because the lifecycle state of a database object is used to partition the objects, when the lifecycle state of a node changes the corresponding rows in the database table migrate from partition to partition, according to the new lifecycle state. Traversal of the tree from the root node down continues (525, Yes) with the nodes at each level applying their inheritance function and setting their lifecycle state appropriately, until traversal is complete (525, No).

In some implementations, the hierarchy traversal is accomplished by the use of the class relations metadata table 215 where the relation-join query is persisted. The construction of the hierarchy traversal query can be described as follows: using the class relations metadata table 215 via a hierarchical query, reach all the nodes of the class relations metadata table avoiding cycles; construct a union query containing all the relation-join queries from the class relations metadata table reached nodes returning the identifiers (e.g., a globally unique identifier (guid) or primary key) for parent and child; and using an outer hierarchical query avoiding cycles reach all of the instance nodes using the result set (parent guid, child guid) of the constructed union query. An example of a constructed hierarchical traversal query for the virtual datacenter hierarchy 350 of FIG. 3 follows. It is understood that the queries illustrated below are for the specific hierarchy 350 of FIG. 3, and given for the purposes of explanation and that implementations are not limited to the examples given.

As indicated above, the construction of the hierarchy traversal query begins with the relation-join queries of the hierarchy. FIG. 10 illustrates example relation-join queries for the database objects in hierarchy 350. As illustrated in FIG. 3, the virtual center class 355 can be a parent for the data center class 360. Thus, class relations metadata table 215 has an entry with the virtual center class 355 as the parent and the data center class 360 as the child. The relation-join query attribute in this entry may be query 1005 of FIG. 10. The data center class 360 may be a parent of the host class 365. Thus, the class relations metadata table 215 has an entry with the data center class 360 as the parent and the host class 365 as the child and query 1015 of FIG. 10 as the relation-join query. Finally, the virtual center class 355 may also have the host class 365 as a child, so the relations metadata table 215 may have an entry with the virtual center class 355 as the parent and the host class 365 as the child with query 1010 of FIG. 10 as the relation-join query attribute of the entry. The relation-join queries may be supplied by a user, e.g., an application programmer, database administrator, etc.

Using the three relation-join queries illustrated in FIG. 10, the system may generate a hierarchy traversal query, for example from the virtual center root to each of the descendants in the hierarchy. To generate the query, the system may first find the class relations metadata table entries 215 that are in the hierarchy that has the virtual center as a root. For each entry found, the system may use the relation-join query for the entry to generate a union query. The union query for the virtual center hierarchy 350 is illustrated as query 1020 of FIG. 10. It includes each of the relation-join queries 1005, 1010, and 1015. From the union query the system may generate the hierarchical traversal query illustrated in FIG. 11. Because this hierarchical traversal query has the virtual center as the root, the relation-join queries where the virtual center is the parent are used to start the hierarchy traversal. The union query generated in the previous step is used for the recursion of the hierarchical query. Cycles are avoided by the "where is_cycle=zero" clause. It is understood that a hierarchy traversal query may be generated for any root of the hierarchy. As illustrated in the example above, the root used determines the relation-join queries used to generate the union query and the starting point in the hierarchy traversal query.

In some implementations, the traversal query is pre-generated and stored as an attribute in the hierarchy-traversal-query attribute of the class for performance optimization. Thus, the query of FIG. 11 may be stored in the hierarchy-traversal-query attribute of the virtual center instance of the class table 210. Of course, the query may also be constructed on the fly as dynamic SQL embedded in the triggers and the lifecycle partitioning maintenance functions. Storing the constructed query as an attribute of the class is a preferred option when the speed of the trigger action is valued. The same reasoning applies for the parents retrieval query used for the calculation of the node's lifecycle as a function of the application of the inheritance function.

In some implementations, the hierarchy traversal could be optimized by determining whether during the hierarchical traversal the parent node of an arc has not changed lifecycle state since the last visit of the arc (multiple visits are possible due to "raggedness"). If the parent node has not changed, do not calculate the lifecycle state of the child node at the point of current reach of the node through the current arc.

FIG. 6 is a flowchart illustrating an example trigger 600 for maintenance of reference partitioning after a child object is inserted into the hierarchy, according to an implementation. The lifecycle state of a non-root object may not be available to the application (it is hidden behind a covering view) so the lifecycle state may be set via a "before trigger" available from the database vendor. In case of MSQL—the corresponding action can be achieved by an "instead of trigger". The system may insert a table row for the child object, and the insert may start trigger 600. When trigger 600 begins, the system may apply the inheritance function for the inserted child (610). As described with regard to FIG. 5, applying the inheritance function may include finding the parents of the inserted child (e.g., using the parent retrieval query for the class table, or generating the query on the fly using the relation-join query of the class relations table) to determine the lifecycle state of the parents, and setting the lifecycle state of the inserted child according to the function (615). Because the child is new, it has no children and trigger 600 ends.

FIG. 7 is a flowchart illustrating an example trigger 700 for maintenance of reference partitioning after a foreign key update of a child object, according to an implementation. The action of the trigger 700 may synchronize the lifecycle state of the updated child and other affected nodes of the hierarchy according to the lifecycle states of the parents, including the new parent. Trigger 700 may be activated after update of a foreign key, e.g., giving the child a new parent in the hierarchy. In trigger 700, the system may apply the inheritance function for the child (715), thereby traversing the tree upwards to locate the parents, including the new parent, and their current lifecycle states. The system may set the lifecycle state of the child according to the inheritance function (720). The child object just updated may be a parent of other children. Accordingly, the system may traverse the hierarchy tree down from the child object to its children (725), if any. At each node below the child with the new parent, the system may apply the inheritance function (730) and update the lifecycle state according to the function (735), as described above with regard to FIG. 5. Traversing the tree downward may continue until all children of the child object that was given a new parent have been reached (740, No). Traversing the tree down from the child object may use hierarchical queries as explained above with regard to FIG. 5. Trigger 700 then ends, having synchronized the lifecycle state of the child according to the stage(s) of its parent(s), and synchronized the lifecycle state of the children of the child that was assigned a new parent.

Implementations that use triggers 500, 600, and 700 with Oracle databases may encounter a table mutating error (exception ORA-4091) for ragged hierarchies that are recursive (e.g. parents persisted in the same table, such as hierarchy 405 of FIG. 4) or cyclic (e.g. hierarchy 475 of FIG. 4). This is because the triggers query the table that caused the trigger to fire, for example to get the parent information as part of applying the inheritance function. Implementations may avoid the table mutating error by the creation of a "before" statement trigger to initialize the package to a known state, creation of an "after" row level trigger to save the row lever action within the package structures, and creation of an "after" statement trigger to process the change using the package structure. A package is an Oracle schema object that groups logically related PL/SQL types, item, and subprograms. A package usually has two parts, a specification (or header) and a body, although the body can be optional. The specification is the interface, declaring the types, variables, constants, exceptions, cursors, and subprograms available for use, and the body fully defines cursors and subprograms. Other users may see details of the specification, but not the body The solution to the table mutating error is also described by Tom Kyte, "Avoiding Mutating Tables," available at http://asktom.oracle.com/pls/asktom/ASKTOM. download_file?p_$_{file=}$6551198119097816936.

FIG. 8 is a flowchart illustrating a process for performing an efficient on-line maintenance process that uses the database agnostic lifecycle framework, according to an implementation. The process 800 of FIG. 8 cascades down the hierarchy, allowing the system to use database-provided partition maintenance operations, rather than row-level commands, to delete or archive deleted database objects. The maintenance process may be executed periodically or as-needed to optimize database usage and performance. The system first receives the class to purge (805). The class is a root in the hierarchy. In some implementations, if the provided class is not a root the process ends. The system finds a database object of the provided class type (807) traverses the tree, depth first, avoiding cycles, from the database object to the leaves (810). A leaf is a node with no children. At a leaf the system applies the maintenance operation if the lifecycle state of the leaf node is "deleted" (815). In other words, the leaf node must have a lifecycle status of deleted and be in the "deleted" partition of the table. The maintenance operation can be a purge or an archive operation. Database vendors provide partition commands for these maintenance operations. For example, Oracle databases provide the TRUNCATE_PARTITION(object) and EXCHANGE_PARTITION(object) commands. MSSQL provides a SWITCH_PARTITION command. DB2 databases provide DETACH, DELETE, and INSERT INTO commands, which can be used to purge or archive objects in the partition. Of course, other databases that support partitions and triggers may supply similar maintenance commands.

The system continues traversing the hierarchy, depth first, avoiding cycles (820, No), repeating step 815 at each leaf node until the system has traversed the entire tree (820, Yes). It is understood that as a leaf is truncated or archived, its parent loses a child, and that once a parent loses all its children, it becomes a leaf node. Thus, as process 800 proceeds, parent nodes become leaf nodes that can be truncated or archived after their children have been truncated or archived. After the system has traversed the entire tree for the particular database object, the system may determine if another database object with the class type of step 805 exists (825). If another object does exist (825, Yes), the system repeats steps 807 to 820, traversing the tree of the next object. When all objects have been evaluated (825, No), process 800 ends.

Performing the maintenance operation (truncate or archive) in reverse order of the levels reached (e.g. bottom first) also allows the partition commands provided by the database vendor to be used because the rule for truncation of a partitioned table is that the descendant partitions must be empty. Using the database-provided partition commands in combination with the bottom-first traversal of the hierarchy results in a maintenance process that is fast and efficient and does not require the database to be taken offline.

The truncate and exchange partition commands under Referential Integrity (RI) may not be supported by all DB vendors (ex. SQL Server, DB2). In situations like this the RI could be imposed via triggers—trigger based RI—or the RI should be disabled for the duration of the maintenance operation.

FIG. 9 is a flowchart illustrating procedures that can be used in an efficient on-line maintenance process in a database that supports reference partitioning, according to an implementation. Oracle databases provide reference partitioning for simple hierarchies, in other words, those without multiple parents and without cycles. A system that uses an Oracle database with simple hierarchies may use the reference partitioning provided by Oracle. However, the reference partitioning provided by Oracle does not offer efficient on-line maintenance, because they lack the cascading TRUNCATE PARTITION and EXCHANGE PARTITION procedures. Oracle TRUNCATE PARTITION does not cascade across the object hierarchy. It has to be performed on every reference partitioned table within the hierarchy. The rule for truncation of a partition of a reference partitioned table or the root partitioned table is—the descendant partitions must be empty. The check for empty descendant partitions must be performed.

The cascade may be automated through a stored procedure, such as stored procedure 900 or 950 illustrated in FIG. 9. The descendants of the reference partitioned hierarchy could be retrieved through the REF_PTN_CONSTRAINT_NAME column within the USER_PART_TABLES catalog table of the Oracle database. The same applies for EXCHANGE PARTITION. The procedures illustrated in FIG. 9 are examples of two different approaches for retrieving the reference partitioned hierarchy for use in a cascading TRUNCATE PARTITION or a cascading EXCHANGE PARTITION maintenance operation in an implementation that uses Oracle's partition by reference hierarchy. Procedure 900 of FIG. 9 represents an Oracle-specific procedure. Procedure 950 of FIG. 9 represents an ANSI SQL procedure that can be used with any database that supports ANSI SQL, including Oracle databases.

Some databases have more than one way to implement partitioning. For example DB2 databases offer Database Partitioning Feature (DPF) that partitions based on a single distribution key, Multidimensional Clustering (MDC) that partitions based on a cluster of columns having the same value, and Table Partitioning (TP) that partitions based on the table partitioning key. This key is usually a range value. Implementations of the lifecycle partitioning system may use any of the offered methods for partitioning, but Table Partition may be best suited for faster cleaning of data through the use of the DETACH operation.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
receiving, from an application program, a new value for a field of a root database object, the root database object being an object in a database partitioned based on values of the field, each database object being a row in a table and the database objects being organized in a hierarchy, wherein the database supports triggers but lacks support for reference partitioning;
updating the value of the field for the root object, thereby causing a table row associated with the root object to change partitions in the database;

locating a first database object that is a child of the root object in the hierarchy;

applying an inheritance function associated with a class of the child object to determine a value of the field for the first database object;

responsive to the determined value differing from a current value of the field for the first database object, changing the current value to the determined value and moving a table row for the first database object to a partition associated with the determined value; and repeating the locating, applying, and changing for all children of the root object.

2. The computer-implemented method of claim 1, wherein the first database object has at least two parent objects in the hierarchy and applying the inheritance function includes:

determining the parent objects using a parent retrieval query associated with the class of the first database object; and determining a value for the field for the determined parent objects that are not the root database object.

3. The computer-implemented method of claim 1, wherein the inheritance function is stored as an attribute of the class in a metadata table.

4. The computer-implemented method of claim 1, wherein the field represents a combination of at least two columns.

5. The computer-implemented method of claim 1, wherein the field is a column in a table supporting the respective database object.

6. The computer-implemented method of claim 1, wherein the field is a column of the table storing the respective database object.

7. The computer-implemented method of claim 1, wherein responsive to the application program updating a foreign key of a second database object, the method further comprises:

applying an inheritance function associated with a class of the second database object to determine a value of the field for the second database object;

setting a current value of the field for the second database object to the determined value;

locating a third database object that is a child of the second database object in the hierarchy;

applying an inheritance function associated with a class of the third database object to determine a value of the field for the third database object;

responsive to the determined value for the third database object differing from a current value for the third database object, changing the current value to the determined value and moving a table row for the third database object to a partition associated with the determined value; and repeating the locating, applying, and changing for all children of the second database object.

8. The computer-implemented method of claim 1, wherein responsive to the application program inserting a second database object into the hierarchy, the second database object being a non-root object for the hierarchy, the method further comprises:

applying an inheritance function associated with a class of the second database object to determine a value of the field for the second database object, wherein a table row for the second database object is stored in a partition associated with the determined value of the field for the second database object.

9. The computer-implemented method of claim 1, wherein the hierarchy is cyclic and the first database object has at least two parent objects in the hierarchy and applying the inheritance function includes:

determining the parent objects using a parent retrieval query associated with the class of the first database object; and determining a value for the field for the determined parent objects that are not the root database object.

10. A system for reference partitioning database objects by values in a reference field, the system comprising:

at least one hardware processor;

at least one database environment, the database environment supporting triggers and partitioning;

at least one application program; and memory storing:

a reference field metadata framework that:

identifies classes in a hierarchy of database objects, identifies at least one class as a root of the hierarchy, identifies, for each non-root class, a reference field inheritance function for the class, and identifies, for each parent class-child class pair in the hierarchy, a relation-join query, the relation-join query being a join between tables in the database environment onto which the parent class and child class are persisted, and triggers that use the framework to maintain values for the reference field for non-root database objects, including at least a first trigger invoked after a reference field of a database object in a root class is changed, a second trigger invoked responsive to a non-root database object being inserted, and a third trigger invoked responsive to a non-root database object having a change in parent.

11. The system of claim 10, wherein the first trigger uses the reference field metadata framework to:

traverse the hierarchy from the database object in the root class downwards, avoiding cycles; and set a value for the reference field of each child database object reached in the traversal according to the reference field inheritance function for a class of the child database object, wherein the child database object is assigned to a partition according to its value for the reference field.

12. The system of claim 10, wherein the second trigger uses the reference field metadata framework to:

determine a value for the reference field of each parent database object of the inserted non-root database object;

apply the reference field inheritance function for the class of the inserted non-root database object to determine a value for the reference field of the non-root database object; and assign the non-root database object to a partition according to the determined value.

13. The system of claim 10, wherein the third trigger uses the reference field metadata framework to:

determine a value for the reference field of each parent database object of the non-root database object;

apply the reference field inheritance function for the class of the non-root database object to determine a value for the reference field of the non-root database object, wherein the database object is assigned to a partition according to the value;

assign the non-root database object to a partition according to the determined value;

traverse the hierarchy from the non-root database object downwards, avoiding cycles; and set a lifecycle state of each object reached in the traversal according to the reference field inheritance function for a class of the object reached in the traversal.

14. The system of claim 10, wherein the system includes at least two database environments from different vendors, each database environment supporting triggers and partitioning.

15. The system of claim 10, wherein the framework further includes a hierarchy traversal query for at least some of the classes and a parent retrieval query for at least some of the classes.

16. The system of claim 15, wherein the hierarchy traversal query for a first class is generated prior to the triggers being invoked and is associated with the first class and stored in the framework, and the generation of the hierarchy traversal query for the first class includes:

using a hierarchical query, avoiding cycles, find the parent class-child class pairs where the first class is the parent;

construct a union query of the relation-join queries for each parent class-child class pair found, the union query returning a result set of identifiers for the parent class and the child class; and using an outer hierarchical query, avoiding cycles, to reach database objects in the tables identified in the union query using the result set of the union query.

17. The system of claim 15, wherein the parent retrieval query for a first class is generated prior to the triggers being invoked and is associated with first class and stored in the framework, and the generation of the parent retrieval query for the first class includes:

using a hierarchical query, avoiding cycles, find the parent class-child class pairs where the first class is the child;

constructing a union query of the relation-join queries for each parent class-child class pair found, the union query returning a result set of identifiers for the parent class and the child class; and using an outer hierarchical query, avoiding cycles, to reach database objects in the tables identified in the union query using the result set of the union query.

18. A system for reference partitioning database objects by values in a reference field, the system comprising:

at least one hardware processor;

at least one database environment, the database environment supporting triggers and partitioning and being partitioned based on values of a reference field;

at least one application program; and memory storing:

a reference field metadata framework that that defines classes of database objects in a hierarchy, parent-child relationships between classes, wherein each database object is a row in a table of the database environment, and instructions that, when executed by the at least one hardware processor, cause the system to perform operations including:

receiving, from the application program, a new value for a foreign key of a child database object, the child database object being a child of a parent object in the hierarchy, applying an inheritance function associated with a class of the child object to determine a value of the reference field for the child database object, changing, responsive to the determined value differing from a current value of the reference field for the child database object, the current value to the determined value and moving a table row for the child database object to a partition associated with the determined value, and repeating the applying and changing for any children of the child database object in the hierarchy.

19. The system of claim 18, wherein the reference field metadata framework also stores, for each parent-child relationship, a join query and wherein repeating the applying and changing includes executing a hierarchical query generated at least by a union of join queries for parent-child relationships related to the class of the child object.

20. The system of claim 18, wherein the reference field metadata framework also stores, for each parent-child relationship, a join query and wherein applying the inheritance function includes using the join query for the class of the child database object.

* * * * *

UNITED STATES PATENT AND TRADEMARK OFFICE
CERTIFICATE OF CORRECTION

PATENT NO. : 10,061,831 B2
APPLICATION NO. : 15/056108
DATED : August 28, 2018
INVENTOR(S) : Milousheff et al.

Page 1 of 1

It is certified that error appears in the above-identified patent and that said Letters Patent is hereby corrected as shown below:

In the Claims

In Column 20, Line 7, Claim 18, delete "framework that that" and insert --framework that--, therefor.

Signed and Sealed this
Thirtieth Day of October, 2018

Andrei Iancu
*Director of the United States Patent and Trademark Office*